United States Patent [19]
Gilbert

[11] Patent Number: 5,231,874
[45] Date of Patent: Aug. 3, 1993

[54] BUFFER ARRANGEMENT WITH BACK FLUSHING OF A QUARTZ PRESSURE TRANSDUCER IN A FORMATION TESTING DEVICE

[75] Inventor: Gregory J. Gilbert, Missouri City, Tex.

[73] Assignee: Halliburton Logging Services Inc., Houston, Tex.

[21] Appl. No.: 748,159

[22] Filed: Aug. 21, 1991

[51] Int. Cl.$^5$ .................. E21B 21/08; E21B 47/06; G01L 7/00

[52] U.S. Cl. .................................... 73/151; 73/707; 73/714

[58] Field of Search .................. 73/151, 707, 714, 152

[56] References Cited

U.S. PATENT DOCUMENTS

| | | | |
|---|---|---|---|
| 2,486,133 | 10/1949 | Egger | 73/707 |
| 2,580,999 | 1/1952 | Conrad | 73/707 |
| 4,096,752 | 6/1978 | Tonnelli | 73/151 |
| 4,573,532 | 3/1986 | Blake | 73/153 |
| 5,024,098 | 6/1991 | Petitjean et al. | 73/151 |
| 5,033,297 | 7/1991 | Gustafson | 73/151 |

*Primary Examiner*—Hezron E. Williams
*Assistant Examiner*—G. Dombroske
*Attorney, Agent, or Firm*—William J. Beard

[57] ABSTRACT

This disclosure sets forth a fluid flow line which extends at one end from a fluid source at a pressure to be measured comprised of fluids contained within a well borehole, and the fluid flow line has a "J" shaped component to trap debris and trash to prevent it from flowing the full length of the fluid flow line and contacting a pressure transducer. The flow line is further defined by the threaded connection of two structural components making up the sonde wherein the components thread together and threads are sufficiently spaced apart to form an elongate helix as part of the flow path.

9 Claims, 1 Drawing Sheet

BUFFER ARRANGEMENT WITH BACK FLUSHING OF A QUARTZ PRESSURE TRANSDUCER IN A FORMATION TESTING DEVICE

BACKGROUND OF THE DISCLOSURE

A formation tester is the oil well logging tool which is lowered on a cable into a well borehole to make hydrostatic as well as formation pressure measurements and obtain formation fluid samples. This normally includes a sonde and the appropriate instrumentation which is enclosed within the sonde. All of this equipment is lowered into a well borehole for making fluid pressure measurements at various depths in the well. Ordinarily, such measurements are made under a standing column of fluid in the well. The fluid is a mixture typically derived from drilling mud, and further including salt water and oil which might be produced from various formations into the well. Drilling mud itself is water or oil based which has been mixed with various weight materials, one example being barites. Whatever the source, the column of fluids standing in the well is ordinarily a dirty fluid. It is important to make accurate pressure measurements and to this end, the preferred form of device for such measurements is a quartz crystal pressure transducer. Quartz transducers that measure pressure utilize a quartz wafer as the resonantor in an oscillator circuit. Pressure exerted along the circumference of the resonator changes the resonant frequency of the circuit. The circuit including the quartz crystal operates at relatively low voltages. To this end, the crystal must be provided with carefully constructed voltage contacts or terminals on it, and they are normally formed with gold leaf which is deposited on the crystal. Accordingly, the crystal itself and the gold lead clad to the surface of the crystal wafer define a delicate instrument. They are delicate, and they are especially so in view of the risk which arises from placing this device in the dirty fluids in the well borehole.

The crystal is located in a cavity within the sonde which is filled with an electrically non-conductive fluid. This fluid filled cavity is connected to the flow line of the formation test tool through a "J" shaped buffer arrangement which provides the location (housing or container) for the interface between the fluid contained within the cavity and the well bore fluid flowing into the flow line of the formation tester. Ideally, the fluid contacting the crystal placed in the crystal chamber is non-conductive, and does not cause corrosion of the crystal, i.e., it is non-corrosive.

Corrosion often occurs when the well fluid contacts the crystal or the gold leaf clad terminals placed on the crystal. The present apparatus sets forth a mechanism which prevents such contact. Moreover, the present apparatus has a special feature which holds down on shock loading. For reasons which may arise in any formation testing operation, a pressure shock wave may travel in the fluid contained within the flow line. The shock wave traveling through the incompressible fluid in the flow line may damage the crystal. The present apparatus includes along and circuitous flow path which is between the well fluid in the flow line and the crystal. This long and circuitous flow path dampens any shock waves. Moreover, the crystal is protected from exposure by this circuitous pathway, meaning exposure to the shock waves and also to the impinging trash and other materials which are laden in the fluids in the well borehole.

The present apparatus is a device which is relatively easy to assemble. It is formed of threaded members, there being three members which are concentrically arranged. This defines a long helical flow path which has a purge valve inlet at one location and an open end at the other. Moreover, it is shaped in the form of a "J" flow path. Heavy particulate trash and the like will settle at the bottom area of the "J" and not flow any further.

The present invention, summarized briefly above, has added protection against the intrusion of trash, corrosive fluids, electrically conductive fluids, and other things which might otherwise damage this expensive measuring device. More will be noted regarding this structure on a review of the below written specification which is considered in conjunction with the drawings attached hereto and in conjunction with the claims set forth thereafter.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
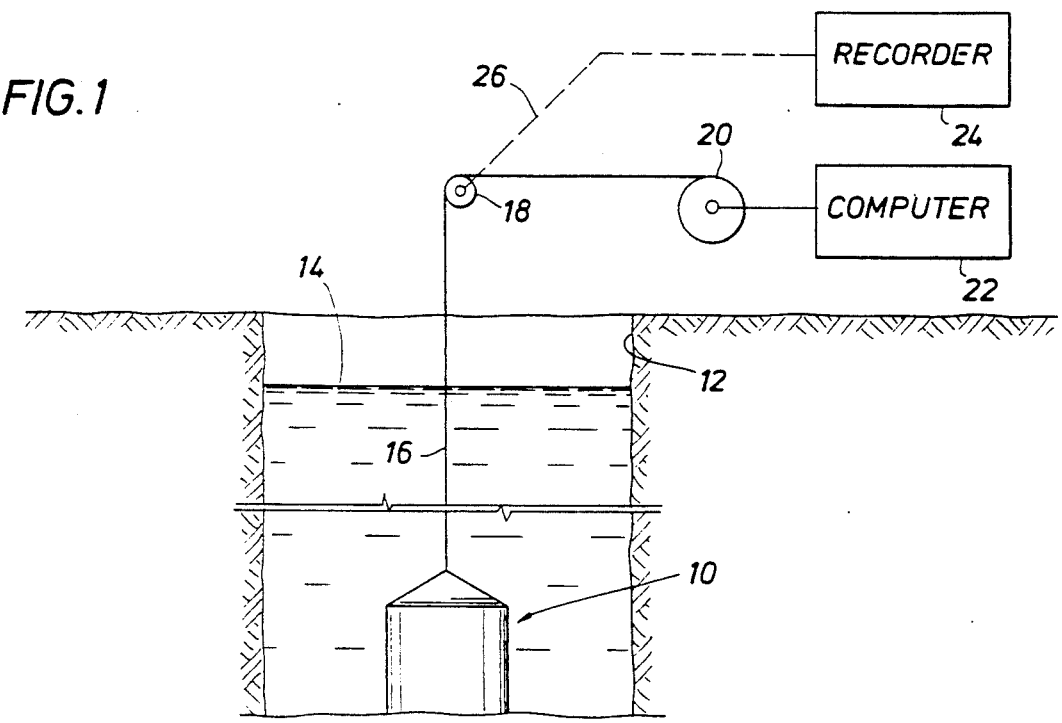
FIG. 1 shows a sonde lowered into a well borehole exposed to fluids in the well.

The numeral 10 identifies a pressure logging tool lowered in a well borehole. The well is either open holed or cased, and the well in this instance is identified by the numeral 12. The well is filled partially, or perhaps to the very top with well fluid 14. The logging tool of this invention is lowered into the well on a logging cable 16 which extends from the top of the tool up to the surface and passes over a sheave 18. The logging cable is spooled on a supply drum or reel 20. The drum or reel stores several thousand feet of cable, for instance, 25,000 feet of cable to extend into the very deepest of wells. The cable includes one or more conductors which provide output signals supplied to the surface which are delivered through the cable to a CPU 22. Data of interest is then supplied to a recorder 24. The recorder 24 is also provided with another input which indicates depth in the well. To this end, an electrical or mechanical depth measuring system 26 connected with the sheave 18 obtains data indicative of depth of the sonde 10 in the well borehole 12 so that such measurements as provided by the instrumentation in the sonde can be correlated to depth in the well.

Figure 2:
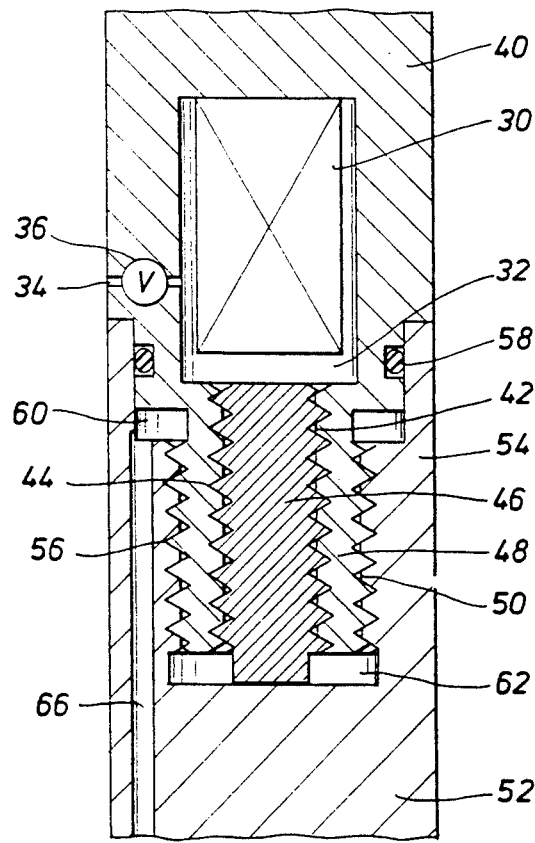
FIG. 2 is a sectional view through the pressure transducer portion of a downhole formation test tool lowered in a well borehole showing details of construction of concentric structural members which define a circuitous flow path which provides access to the well fluids contained within the flow line of the formation test tool and yet isolates the transducer with a protective fluid in a chamber therearound.

The sonde 10 incorporates a structure which encloses various types of equipment and electronic devices such as telemetry equipment. An important feature however for the present apparatus is that portion of the sonde which includes the transducer. To this end, the numeral 30 in FIG. 2 identifies a quartz crystal transducer which is received within a chamber 32 in the sonde. The chamber 32 is sufficiently large to receive a volume of isolation fluid as will be described. This fluid fills the chamber 32 and contacts the quartz crystal 30 on all exposed faces. The quartz crystal 30 is ordinarily constructed with surface located terminals or metal clad layers typically formed of gold leaf. The terminals are quite thin. They are subject to destruction by means of abrasion or corrosion. Corrosion and abrasion will particularly occur when fluid from the well borehole contacts the crystal 30. The chamber 30 is connected to the exterior of the tool by means of a passage 34. The purge passage 34 provides a flow path through a valve 36 which can be opened and closed, for instance, during charging of the apparatus. The valve 36 is normally opened during servicing of the pressure measuring tool 10 at the surface so that a specially selected fluid can be delivered through the passage 34 and the valve 36 to fill the chamber 32. More fluid than this is pumped in; enough fluid is pumped in to fill all the passages as will be described below. The fluid is preferably a clean fluid which is known as DC 200 which is pumped to the passage or chamber 32 by a hand pump or the like. This fluid prevents corrosion. It is also non-conductive so that an electrical output can be provided. It also protects the gold foil cladding on the quartz crystal body 30.

The chamber 32 is formed in a body 40 which makes up a portion of the sonde 10. This body is constructed of metal and is axially drilled from the lower end as shown in the drawing. There is a hollow passage 42 which is counter sunk into the structure of the sonde. This drilled passage provides an open passage way. This passage is partially threaded on the interior with a set of threads at 44. The threads 44 are cut so that they will accept a threaded member 46. The member 46 is threaded along its full length so that it can thread into the passage 42 and move to a specified depth therein. It should not be over threaded, because it will otherwise enter the chamber 32 to crush the quartz crystal 30.

The threaded plug 46 mates with the internal threads 44. However, the threads are not cut to a full gage so that there is a multiturn helical passage along the threaded plug 46. The operation of this passage will be described in detail hereinafter.

The lower portions of the sonde are further constructed to define a surrounding skirt 48. The skirt 48 is internally hollow to form the passage 42 just mentioned. The external surface of it is formed into a thread 50. The thread is cut full gage. This thread engages a lower body 52. The body 52 has a transverse end member and an upstanding cylindrical skirt 54. The skirt 54 is cut with a thread at 56 but again, the thread 56 is not cut to a full depth or full gage. This makes a relatively shallow thread which mates or matches the threads at 50. This again defines a second helical passage along the threaded connection just mentioned.

The lower body 52 is snugged up against the sonde body and is made fast against it by full threaded connection. A seal 58, such as an O-ring, provides a barrier between the Sonde body 40 and the lower body 52. There is a surrounding shoulder at the top end of the cap which has been internally undercut to thereby define an internal manifold passage 60. This fully encircles the interior of the body 52. At the lower end of the skirt 54, there is a chamber 62 which is defined by the space between the body 52 and the structure thereabove. The chamber 62 is a trash receiving chamber as will be described. There are two flow paths into the chamber 62. One is adjacent the threads 56, and the other is adjacent the threads 44. There is only one external flow opening into the circuitous path ways just mentioned and that is by introducing flow from the flow line 66 through the internal manifold passage 60 when the body 52 is fully threaded.

Summarizing certain aspects of the foregoing, there is in fact a single flow path which is a "J" shaped flow path serving as a trash trap. The single flow path extends from the flow line 66 of the formation test tool to the quartz crystal 30. The single flow path begins with the flow line 66 and opens into the chamber 60. The next segment of the flow path is the spiral downwardly through the threads at 56. This extends to the chamber 62. This chamber is located below the manifold passage 60. To the extent trash enters and gets into the helical threaded pathway, the trash will eventually flow downwardly and collect in the chamber 62. The chamber 62 is periodically cleaned by removing the body 52 during tool service. The flow path extends through the chamber 62 and then travels upwardly along the threads 44 to the larger chamber 32 which is well above the chamber 62. This defines a "J" shaped flow path which has a low spot at the chamber 62 for collecting trash and debris.

In operation, the device of the present disclosure is first charged at the surface by opening the valve 36, connecting a flow line at the passage 34 and delivering the fluid into the chamber 32 and completely filling the passages until fluid emerges through the flow line 66 downward in the main body of the formation test tool 10. In other words, the entire internal passage way is fluid filled with the fluid which provides isolation.

There are several benefits from filling the passages in this fashion with fluid which protects the quartz crystal 30. First of all, corrosion is reduced because well fluids do not contact the quartz crystal. In addition to that, non-conductive fluid contacts the crystal, thereby excluding more conductive fluids such as salt water which are likely to be found in the well 12. In addition to that, the crystal is protected from shock waves which originate by rapid changes of pressure. Assume for purposes of description that a pressure shock wave is formed externally of the sonde. The shock wave is propagated along the circuitous passages. This has a dampening effect. Assume for purposes of description that particulate trash works its way into the passages. Since the fluid flow and the associated trash carried by it must flow in the sequence of the passages as constructed, it flows toward the low region which is the chamber 62 and is trapped. This reduces the tendency of the particulate trash to flow through all the passages and finally come into contact with the quartz crystal 30. The chamber 62 is also effective as a fluid separator. Assuming the formation produces a mixture of oil and water, any water which works its way into the several passages will collect in the chamber 62. The oil will float on top of water, and being lighter, will be more than likely directed into the threaded area at 44 to move upwardly to the chamber 32. Fortunately, this type of well fluid intrusion is highly unlikely to contact the quartz crystal when protected by the assembly of this disclosure which particularly has a serpentine flow path tending to exclude trash and unwanted water.

The present apparatus particularly is effective in resisting sharply defined shock wave fronts or extremely sharp pressure changes. It also shows great advantage in that any fluid which enters the equipment must flow over an effectively long length to assure that the crystal 30 is operatively pressurized by the well fluid in the flow line of the sonde.

Assembly of the present apparatus is believed to be straight forward. When out of the hole, assembly is carried out merely by threading the plug 46 into position to capture the quartz crystal 30 in the chamber. After that, the lower body is threaded to the illustrated position. The system is checked to be sure that it is purged of compressible air; the system is then filled with the desired electrical insulating material having the preferred form of DC 200 brand of specially designed lubricant and pressure fluid.

In field use, the serpentine passage shown in this disclosure is preferably purged after each use. Before the tool is placed in the well, the valve 36 is closed to trap fluid in the chamber 32 and the passage ways leading to the chamber. After each run, the valve 36 is momentarily opened and additional protective fluid is pumped in through the valve 36. This continues as well fluid and other trash from the well are forced out through the flow line 66. This assures that the crystal 30 contacts only the desirable fluid, not well fluids. Nevertheless, pressure from the well fluid is coupled through the serpentine passage and acts against the crystal in the intended fashion. Protection in the use of the quartz crystal is assured by this approach.

While the foregoing is directed to the preferred embodiment, the scope thereof is determined by the claims which follow.

What is claimed is:

1. For use with a pressure sensor located in a sensor chamber in a sonde wherein the pressure sensor forms measurements of ambient pressure, an apparatus which comprises an elongate flow path from said sensor chamber to a source of fluid to be measured and wherein said fluid flow path comprises a passage within the threads of first and second threaded sonde components threaded together to define a helical flow path, wherein said helical flow path comprises first and second helical flow path segments serially connected.

2. The apparatus of claim 1 wherein said helical flow path extends along the length of a threaded connection of said threaded components of said sonde.

3. The apparatus of claim 1 wherein said first and second segments serially connect at a trash capturing chamber means.

4. The apparatus of claim 3 wherein said first and second segments are defined on threaded assembly of sonde components.

5. The apparatus of claim 4 wherein the second end of the fluid flow path connects to a source of fluid to be measured.

6. The apparatus of claim 4 wherein the second end of the fluid flow path connects to well fluid from a well formation.

7. The apparatus of claim 4 wherein said fluid flow line permits bidirectional fluid flow to enable flushing.

8. The apparatus of claim 4 including a purge port connected to said fluid flow line.

9. A pressure transducer system for installation in a sonde lowered in a well borehole comprising:
   (a) a sonde;
   (b) a pressure sensor in a sensor chamber in the sonde;
   (c) a fluid flow line opening into said sensor chamber at one end thereof and said flow line having a second end exposed to a fluid at a pressure to be measured by the pressure sensor in said sensor chamber.
   (d) wherein said fluid flow line has a variation in elevation therealong when said sonde is in the well borehole;
   (e) a trap in the fluid flow line for trash entering said fluid flow line wherein said trap is an enlarged area in said fluid flow line; and is lower than said sensor chamber and is lower than the second end of said fluid flow line; and
   (f) wherein said trap comprises a trap chamber connecting to said flow line at top portions of said trap chamber.

* * * * *